United States Patent
Liang

(10) Patent No.: US 11,059,095 B2
(45) Date of Patent: Jul. 13, 2021

(54) METHOD AND APPARATUS FOR GENERATING A MOLTEN RAW MATERIAL FOR THREE-DIMENSIONAL PRINTING

(71) Applicant: NANJING TAITAO INTELLIGENT SYSTEM CO., LTD., Jaingsu (CN)

(72) Inventor: Fupeng Liang, Jiangsu (CN)

(73) Assignee: NANJING TAITAO INTELLIGENT SYSTEM CO., LTD., Jiangsu (CN)

( * ) Notice: Subject to any disclaimer, the term of this patent is extended or adjusted under 35 U.S.C. 154(b) by 122 days.

(21) Appl. No.: 16/463,574

(22) PCT Filed: Nov. 24, 2017

(86) PCT No.: PCT/CN2017/112833
§ 371 (c)(1),
(2) Date: May 23, 2019

(87) PCT Pub. No.: WO2018/095404
PCT Pub. Date: May 31, 2018

(65) Prior Publication Data
US 2019/0314891 A1    Oct. 17, 2019

(30) Foreign Application Priority Data
Nov. 26, 2016    (CN) .......................... 201611060159.8

(51) Int. Cl.
*B33Y 10/00*    (2015.01)
*B33Y 30/00*    (2015.01)
(Continued)

(52) U.S. Cl.
CPC .......... *B22D 23/003* (2013.01); *B22D 25/02* (2013.01); *B33Y 10/00* (2014.12); *B33Y 30/00* (2014.12)

(58) Field of Classification Search
CPC ...... B33Y 10/00; B33Y 30/00; B22D 23/003; B22D 25/02
(Continued)

(56) References Cited

U.S. PATENT DOCUMENTS

| 9,050,753 B2 | 6/2015 | Rodgers et al. |
| 2014/0265037 A1* | 9/2014 | Stirling ................. B29C 48/802 264/403 |

(Continued)

FOREIGN PATENT DOCUMENTS

| CN | 104174842 A | 12/2014 |
| CN | 204749271 U | 11/2015 |

(Continued)

OTHER PUBLICATIONS

"International Application Serial No. PCT/CN2017/112833, International Search Report dated Feb. 24, 2018", (dated Feb. 24, 2018), 6 pgs.

(Continued)

*Primary Examiner* — Scott R Kastler
(74) *Attorney, Agent, or Firm* — Schwegman Lundberg & Woessner, P.A.

(57) ABSTRACT

A method and apparatus for generating a molten raw material for three-dimensional printing, in which a solid raw material is heated to obtain the molten raw material. The solid raw material is heated to a molten state by electromagnetic induction outside the output end of the guiding device to form a molten segment. The molten segment is supported by the solid raw material and is not in contact with other structures after being in contact with the printed object and/or the support platform.

9 Claims, 2 Drawing Sheets

(51) Int. Cl.
*B22D 23/00* (2006.01)
*B22D 25/02* (2006.01)

(58) Field of Classification Search
USPC .......................................................... 222/593
See application file for complete search history.

(56) References Cited

U.S. PATENT DOCUMENTS

2016/0361763 A1\* 12/2016 Batchelder ............. B33Y 30/00
2019/0314891 A1\* 10/2019 Liang ..................... B33Y 70/00

FOREIGN PATENT DOCUMENTS

| CN | 105261911 A | 1/2016 |
| CN | 105798299 A | 7/2016 |
| CN | 105880598 A | 8/2016 |
| CN | 205705343 U | 11/2016 |
| CN | 106965421 A | 7/2017 |
| JP | 08281807 A | 10/1996 |

OTHER PUBLICATIONS

"International Application Serial No. PCT/CN2017/112833, Written Opinion dated Feb. 24, 2018", (dated Feb. 24, 2018), 4 pgs.

"Chinese Application Serial No. 201611060159.8, Office Action dated Jun. 4, 2019", w/ English Translation, (dated Jun. 4, 2019), 17 pgs.

"Chinese Application Serial No. 201611060159.8, Office Action dated Oct. 8, 2018", w/ English Translation, (dated Oct. 8, 2018), 11 pgs.

"Chinese Application Serial No. 201611060159.8, Office Action dated Dec. 3, 2019", w/ English Translation, (dated Dec. 3, 2019), 24 pgs.

Fang, Ming, et al., "Experiments on remelting and solidification of molten metal droplets deposited in vertical columns", Journal of Manufacturing Science and Engineering 129.2, (2007), 311-318.

\* cited by examiner

METHOD AND APPARATUS FOR GENERATING A MOLTEN RAW MATERIAL FOR THREE-DIMENSIONAL PRINTING

PRIORITY APPLICATIONS

This application is a U.S. National Stage Filing under 35 U.S.C. 371 from International Application No. PCT/CN2017/112833, filed on Nov. 24, 2017, and published as WO2018/095404 on May 31, 2018, which claims the benefit of priority to Chinese Application No. 201611060159.8, filed on Nov. 26, 2016; the benefit of priority of each of which is hereby claimed herein, and which applications and publication are hereby incorporated herein by reference in their entirety.

FIELD OF THE INVENTION

The present invention relates to the technology of generating a molten raw material in the technique of three-dimensional printing, in particular to a method and apparatus for generating a molten raw material based on an electromagnetic induction heating principle, with a high controllability and applicable to materials with an ultrahigh melting point, belonging to the technical field of additive manufacturing.

BACKGROUND OF THE INVENTION

Three-dimensional printing technology originated in the U.S. at the end of the 19$^{th}$ century, and was perfected and commercialized in Japan and the U.S. in the 1970s and 1980s. The mainstream three-dimensional printing technologies commonly seen now, such as Stereo Lithography Apparatus (SLA), Fused Deposition Modeling (FDM), Selecting Laser Sintering (SLS) and Three Dimensional Printing and Gluing (3DP), were commercialized in the U.S. in the 1980s and the 1990s. In the technology in which three-dimensional printing is achieved through stacking a molten raw material, such as the commonly seen FDM plastic printing and other metal printing with similar principles, one of the important core components is a furnace/extrusion head/generation apparatus which generates a molten raw material. For another example, a printing technology for spraying a molten raw material also belongs to stacking a molten raw material, and its spraying device for a molten raw material is also a core component. At present, many patent applications on a generation apparatus for generating a molten metal raw material are available, such as a Chinese patent application with an application number of 201410513433.7 and entitled "3D Printing Head for Metal Melt Extrusion Building", and a Chinese patent application with an application number of 201520533246.5 and entitled "Apparatus for Semi-solid Metal Extrusion Deposition Building". Through these patent applications, droplets cannot be generated and continuous metal flows can be generated. An air pressure can also be adopted as a spraying power to generate metal droplets, such as an apparatus and method recorded in the literature entitled "Experiments on remelting and solidification of molten metal droplets deposited in vertical columns" (source: title of the journal: *Journal of Manufacturing Science and Engineering-Transactions of the Asme*, Pages 311-318, No. 2, Vol. 129, 2007). Its major principle is as follows: a pulsed air current is adopted to generate a pulsed pressure vibration inside a miniature furnace/crucible to form metal droplets at an outlet of a nozzle. A Chinese patent application with an application number of 201520561484.7 and entitled "Liquid Metal Printing Cartridge" uses a similar method as the technique recorded in the literature; for another example, in a Chinese patent application with an application number of 201520644682.X and entitled "Apparatus for Metal 3D Printing with Supporting Structure", a pulsed air current/air pressure is also adopted to generate metal droplets. In these methods for generating metal droplets, metal droplets are generated by applying a pulsed pressure and utilizing the characteristics of a fluid, and continuous metal flows can also be generated; however, in these technologies, solid raw materials cannot be added continuously in an operating process, which brings inconvenience to some printing situations (for example, when printing a large-scale metal component), meanwhile, in this type of technology, since a gas is in a compressible physical form, pressure conduction is delayed, and the generation speed of metal droplets is low, and even more seriously, the controllability is poor. In the prior art, if a ratio of an inner diameter of a nozzle to an inner diameter of a liquid raw material storage bin or a main flow channel is too small (for example, the inner diameter of a raw material bin or a main flow channel which is connected with a nozzle is 2 mm, and the inner diameter of a nozzle is 50 μm), especially when the raw material is a liquid metal, the surface tension and the viscosity of a liquid raw material are relatively big, then spraying can be achieved only by applying a great pressure to overcome the surface tension and the flow resistance.

In 2D printing technologies, through commonly used spraying techniques, droplets can be generated rapidly, for example, Hewlett Packard of the U.S. and Epson of Japan developed spraying technologies of an ink-jet printer, through which liquid spraying is achieved based on deformation extrusion of a flow channel (an electrodeformation material is arranged on a wall of a flow channel of a nozzle or on a control cavity connected with a flow channel) or partial heating and evaporation (a heating element is arranged on a wall of a flow channel of a nozzle), however, these technologies are not applicable to spraying a molten material with a high melting point (for example, aerial aluminium alloy, copper, stainless steel, etc.), and are not applicable to spraying a liquid material with a high viscosity. Although a multi-jet-fusion (MJF) plastic 3D printing technology disclosed by Hewlett Packard of the U.S. in 2015 used a spraying technique of 2D ink-jet printing, the sprayed liquid is only an auxiliary reagent with a high fluidity (the sprayed reagent is liquid at a normal temperature), and a material of the main part is still solid plastic powder (a plastic powder layer is paved by adopting a method similar to an SLS powder spreading technology).

Some methods of spraying a liquid raw material based on an electric field force, such as an "electric field spraying" technique (see a book of 《*Electric Field Spraying*》, written by Li Jianlin, and published by Shanghai Jiao Tong University Press in 2012), are also available. For another example, Chinese patent applications with an application number of 201610224283.7 (entitled "Liquid Metal Printing Equipment") and with an application number of 201310618953.X (entitled "3D Printer with Variable Diameter and Driven by High-voltage Static") also use an electric field driving technique. In these technologies, a high-voltage electrostatic field or a pulsed high-voltage electrostatic field is established between a nozzle (the nozzle must be manufactured from non-conductive materials) and an external electrode (a printing support platform serves as an electrode), so as to achieve spraying of a liquid raw material; however, there are also limitations for "electric field spraying", for example, since a liquid raw material has a viscosity, especially for a liquid metal with a great surface tension, a high-voltage electrostatic field or even an extra-high electrostatic field must be applied to generate a tensile force required for overcoming a viscous force and surface tension of a liquid raw material and generate a certain flow rate. A high-voltage electric field is hazardous, and an electric breakdown is prone to occur, and the controllability is not high. Since the controllability of a high-voltage electric field is not high, then a controllability of an electric field spraying process is not high, and the controllability of generated droplets is not high.

The existing numerous techniques for generating a molten raw material as mentioned above cannot generate a molten raw material for a metal with a high melting point, such as titanium and tungsten. Meanwhile, in the prior art, energy consumption is high in a process of generating a molten raw material.

SUMMARY OF THE INVENTION

An objective of the present invention is to provide a method and apparatus for generating a molten raw material with a high controllability for three-dimensional printing, in which the raw material used can be heated by electromagnetic induction.

Another objective of the present invention is to provide a method applicable for generating a molten raw material of a conductive material with an ultrahigh melting point, so as to realize three-dimensional printing of parts resistant to high temperature.

To achieve the above objectives of the present invention, the present invention adopts the following technical solution: a method for generating a molten raw material for three-dimensional printing is provided, in which a solid raw material is heated to obtain the molten raw material, and a guiding device is adopted to guide a movement of the solid raw material in a process of generating the molten raw material; the guiding device is provided with an input end and an output end, the solid raw material is input from the input end of the guiding device, and the solid raw material or the molten raw material is output from the output end of the guiding device; the molten raw material generated is accumulated on a printed object or on a support platform of a three-dimensional printing apparatus; the printed object is an object generated through accumulation of the molten raw material in a process of three-dimensional printing, and the support platform is a device or structure, configured to support the printed object in the process of three-dimensional printing, of a three-dimensional printing apparatus; characterized in that:

the solid raw material is heated to a molten state by electromagnetic induction at the output end of the guiding device and/or outside the output end of the guiding device and thus a molten segment is formed; the molten segment generated is only in contact with the solid raw material and is supported by the solid raw material before being in contact with the printed object and/or the support platform; the molten segment generated is in contact with the solid raw material, the printed object and/or the support platform and is not in contact with other structures after being in contact with the printed object and/or the support platform, and the molten segment is supported by being in contact with the solid raw material, the printed object and/or the support platform;

the molten segment is namely the molten raw material; and the solid raw material used is meltable through electromagnetic induction heating.

Optionally:

the molten segment generated is not in contact with the guiding device, and the molten segment is not in contact with an electromagnetic induction heating generator; and the electromagnetic induction heating generator is configured to play a role of electromagnetic induction heating.

Optionally:

in a three-dimensional printing process, the molten segment generated is only in contact with the solid raw material, the printed object and/or the support platform or a support body, and is not in contact with other structures; and the support body refers to a structure which plays a role of supporting in the three-dimensional printing process (for example, an auxiliary support, an auxiliary support powder). If a protective atmosphere is used in the process of generating a molten raw material, then the molten segment is in contact with the protective atmosphere, however, the protective atmosphere possesses no structural morphology.

Optionally:

the position of the molten raw material is controlled in a way as follows: the molten raw material is pushed away from the guiding device and/or away from a heating magnetic field generated by an electromagnetic induction heating generator and to move towards the printed object or the support platform through a movement generated by the solid raw material when the solid raw material passes through the guiding device; the accumulation position of the molten raw material is controlled by the relative movement between the solid raw material and the printed object or the support platform; and the electromagnetic induction heating generator is configured to play a role of electromagnetic induction heating.

Optionally:

major steps of generating a molten raw material comprise:

step S1, the guiding device is driven to move to a specific spatial position, wherein the specific spatial position is designated by a control program of a three-dimensional printing system (for example, to move to an initial position of printing according to a mapping relationship between a CAD data model and the support platform);

step S2, an electromagnetic induction heating magnetic field is activated, and the solid raw material is driven to pass through the guiding device;

step S3, the solid raw material is melted through electromagnetic induction heating outside the guiding device, or is melted through electromagnetic induction heating within a channel of the output end of the guiding device, and the segment melted forms a molten segment;

step S4, the molten segment generated is pushed away from the guiding device and/or away from the electromagnetic induction heating magnetic field through a movement generated by the solid raw material when the solid raw material passes through the guiding device; meanwhile, the guiding device is driven to move and bring the solid raw material to move, so as to control the contact position between the molten segment and the printed object or the support platform;

step S5, if generation of the molten raw material needs to be stopped, then stop driving the solid raw material to pass through the guiding device;

step S6, the electromagnetic induction heating magnetic field is shutdown or not shutdown; and the guiding device is driven to move to a set spatial position (for example, a standby position).

Optionally:

the support platform is a part to be repaired, that is, the molten raw material is accumulated on a defective position of a defective part, so as to realize repairing of the defective part.

Optionally:

in the process of generating a molten raw material, after the molten raw material is in contact with the printed object or the support platform, a current is applied between the solid raw material and the printed object or the support platform. Through the current applied, an effect of resistance heating is generated (the resistance heating is also known as resistance heat generation), then the process in which a solid raw material is changed into a molten raw material is influenced (for example, in the process of generating a molten raw material, the molten raw material is heated to be fused through the current, so as to generate a molten raw material, which is separate from the solid raw material, on the printed object or the support platform; for another example, the melting rate can be accelerated through the effect of resistance heating).

Optionally:

major steps of generating a molten raw material comprise:

step S1, the guiding device is driven to move to a specific spatial position, wherein the specific spatial position is designated by a control program of a three-dimensional printing system (for example, to move to an initial position of printing according to a mapping relationship between a CAD data model and the support platform);

step S2, an electromagnetic induction heating magnetic field is activated, and the solid raw material is driven to pass through the guiding device;

step S3, the solid raw material is melted through electromagnetic induction heating outside the guiding device, or is melted through electromagnetic induction heating within a channel of the output end of the guiding device, and the segment melted forms a molten segment;

step S4, the molten segment generated is pushed away from the guiding device and/or away from the electromagnetic induction heating magnetic field through a movement of the solid raw material when the solid raw material passes through the guiding device; meanwhile, the guiding device is driven to move and bring the solid raw material to move, so as to control the contact position between the molten segment and the printed object or the support platform;

step S5, if generation of the molten raw material needs to be stopped, then stop driving the solid raw material to pass through the guiding device;

step S6, a current is applied between the solid raw material and the printed object or the support platform, and a resistance heating effect is generated through the current applied to fuse the molten segment;

step S7, the electromagnetic induction heating magnetic field is shutdown or not shutdown; and the guiding device is driven to move to a set spatial position (for example, a standby position).

Optionally:

the direction and the rate of the movement of the solid raw material are controllable; when generation of a molten raw material is to be finished, the solid raw material is withdrawn towards the guiding device, and the length to be withdrawn can be set.

Optionally:

major steps of generating a molten raw material comprise:

step S1, a guiding device is driven to move to a specific spatial position, wherein the specific spatial position is designated by a control program of a three-dimensional printing system (for example, to move to an initial position of printing according to a mapping relationship between a CAD data model and the support platform);

step S2, an electromagnetic induction heating magnetic field is activated, and the solid raw material is driven to pass through the guiding device;

step S3, the solid raw material is melted through electromagnetic induction heating outside the guiding device, or is melted through electromagnetic induction heating within a channel of the output end of the guiding device, and the segment melted forms a molten segment;

step S4, the molten segment generated is pushed away from the guiding device and/or away from the electromagnetic induction heating magnetic field through a movement of the solid raw material when the solid raw material passes through the guiding device; meanwhile, the guiding device is driven to move and bring the solid raw material to move, so as to control the contact position between the molten segment and the printed object or the support platform;

step S5, if generation of the molten raw material needs to be stopped, then the solid raw material is driven to withdraw for a set length towards the guiding device;

step S6, a current is applied between the solid raw material and the printed object or the support platform, and a resistance heating effect is generated through the current applied to fuse the molten segment;

step S7, the electromagnetic induction heating magnetic field is shutdown or not shutdown; and the guiding device is driven to move to a set spatial position (for example, a standby position).

Optionally:

the solid raw material adopts (or is) a wirelike solid raw material, a filamentous solid raw material, a strip-shaped solid raw material or a bar-shaped solid raw material; and the solid raw material adopts (or is) a conductive material.

Optionally:

the magnetic field which produces an electromagnetic induction heating effect heats the guiding device, and the heat carried in the guiding device is partially or completely transferred to the solid raw material before the solid raw material is melted.

Optionally:

the guiding device is provided with a driving device and/or an electromagnetic induction heating generator, wherein the driving device is configured to push and/or pull the solid raw material to move, and the electromagnetic induction heating generator is configured to play a role of electromagnetic induction heating.

Further, the present invention provides an apparatus for generating a molten raw material, to which the above method for generating a molten raw material for three-dimensional printing is applied, and the technical solution thereof is as follows: an apparatus for generating a molten raw material for three-dimensional printing is mainly composed of a driving device, a guiding device, and an electromagnetic induction heating generator, wherein the driving device is configured to push and/or pull a solid raw material to move; the guiding device is configured to guide a movement of the solid raw material, and the guiding device is provided with an input end and an output end; the electromagnetic induction heating generator is configured to generate a magnetic field to heat the solid raw material, the electromagnetic induction heating generator is mainly composed of an energy output stage and an energy input stage, wherein the energy output stage generates a magnetic field, and the energy input stage modulates a current input from an external source and outputs the current modulated to the energy output stage; the driving device is connected or not connected with the guiding device, and the electromagnetic induction heating generator is connected or not connected with the guiding device;

characterized in that:

a positional relationship between the electromagnetic induction heating generator and the guiding device is as follows: the magnetic field generated by the electromagnetic induction heating generator presents a relationship of connection in series, a nested relationship or an overlapping relationship with the output end of the guiding device on a movement route along which the solid raw material passes through the guiding device;

an eddy current is induced in the solid raw material when the solid raw material passes through the magnetic field generated by the electromagnetic induction heating generator, so that the solid raw material can be directly heated; the solid raw material is heated to generate a molten segment, the molten segment generated is pushed by the solid raw material to leave the magnetic field generated by the electromagnetic induction heating generator, or leave the magnetic field generated by the electromagnetic induction heating generator and a space surrounded or partially surrounded by the guiding device; and a positional relationship between the electromagnetic induction heating generator, the guiding device and the molten segment generated is as follows: the molten segment is not in contact with the guiding device, and the molten segment is not in contact with the electromagnetic induction heating generator.

Optionally:

the output stage of the electromagnetic induction heating generator is arranged outside the output end of the guiding device and presents a relationship of connection in series with the output end of the guiding device on a movement route along which the solid raw material passes through the guiding device, that is, the solid raw material is output from the output end of the guiding device, and enters a space surrounded or partially surrounded by the output stage of the electromagnetic induction heating generator;

the solid raw material is melted in the space surrounded or partially surrounded by the output stage of the electromagnetic induction heating generator, and thus a molten segment connected with the solid raw material is formed; and the molten segment is not in contact with the output stage of the electromagnetic induction heating generator, that is, a space surrounding the molten segment exists between the molten segment and the output stage of the electromagnetic induction heating generator;

or:

the output stage of the electromagnetic induction heating generator is arranged at the output end of the guiding device and presents a nested relationship or an overlapping relationship with the output end of the guiding device on a movement route along which the solid raw material passes through the guiding device, that is, a nested or overlapping area exists between the space surrounded or partially surrounded by the output stage of the electromagnetic induction heating generator and a space surrounded or partially surrounded by the output end of the guiding device, the solid raw material is melted in the area when the solid raw material passes through the nested or overlapping area, and thus a molten segment connected with the solid raw material is formed;

the molten segment generated is not in contact with the output stage of the electromagnetic induction heating generator, and is not in contact with the output end of the guiding device, that is, a space surrounding the molten segment exists between the molten segment and the output stage of the electromagnetic induction heating generator and the output end of the guiding device.

Optionally:

a cooling structure is arranged at the output end of the guiding device, and is configured to guide away or partially guide away the heat at the output end of the guiding device and/or the electromagnetic induction heating generator.

Optionally:

the driving device is mainly composed of a feeding roller, a pressing roller and a motor, or is mainly composed of a feeding roller and a motor; wherein the motor drives the feeding roller to rotate, and the feeding roller brings the solid raw material to move.

Optionally:

the guiding device is provided with a groove structure, a hole structure or a ring structure, which serves as a guiding structure to guide the movement of the solid raw material; and the guiding device is provided with an elastic structure configured to enhance a fitting degree between the solid raw material and the guiding device.

Optionally:

the magnetic field generated by the electromagnetic induction heating generator heats the output end of the guiding device, and the heat generated at the output end of the guiding device is partially or completely transferred to the solid raw material before the solid raw material is melted.

Optionally:

the energy output stage of the electromagnetic induction heating generator is an induction coil; the number of turns of the induction coil is more than one or one or less than one (less than one turn means under one turn, e.g., 0.8 turn). The shape of the energy output stage is not limited to the form of an induction coil, and during industrial applications (such as commonly seen electromagnetic induction quenching machines), energy output stages of various shapes, for example, petal-shaped energy output stages or parallel-plate-shaped energy output stages (similar to a capacitor), need to be manufactured according to specific requirements.

Optionally:

the contour of a radial cross section of a channel of the output end of the guiding device is compatible with the contour of a radial cross section of the solid raw material, the shape of the radial cross section and the shape of the channel of the output end of the guiding device at least satisfy the condition that the solid raw material is allowed to pass therethrough.

Optionally:

when the driving device is connected with the guiding device, an integrated functional component can be formed. The driving device serves as a part of the guiding device, or the guiding device serves as a part of the driving device.

Optionally:

when the electromagnetic induction heating generator is connected with the guiding device, an integrated functional component can be formed. The electromagnetic induction heating generator serves as a part of the guiding device, or the guiding device serves as a part of the electromagnetic induction heating generator.

The present invention has the following beneficial effects:

(1) In the present invention, such containers as a furnace, a crucible or an extrusion head are not used. In the process in which a mobile solid raw material passes through the heating magnetic field, a specific portion or segment of the solid raw material is heated to a molten state, the range of action of heating energy is concentrated, the heated solid raw material is small in size, the generation rate of a molten raw material is high, which belongs to a technology of "generating at real time as required"; the position or state of the molten raw material is not controlled through such a compressible media as gas, and the output of the molten raw material is also not controlled through such containers as a furnace, a crucible or an extrusion head. Since the molten raw material is small in size and is directly connected with the solid raw material, and the molten raw material is not in contact with the heating device and is not in contact with the container (a problem of low controllability caused by a viscous force between a molten raw material and a nozzle of a container existing in the existing technology in which a molten raw material is generated by adopting containers does not exist), therefore, a position control of the molten raw material can be realized through a position control of the solid raw material, thus, the response speed of the position control of the molten raw material is high; since the molten raw material generated is not in contact with the heating device and not in contact with the container, the problem that the molten raw material (especially a high-temperature molten raw material) destroys or corrodes the heating device (or the container) does not exist, therefore, the service life of the apparatus in the present invention is long, and thus, the apparatus in the present invention is high in controllability, simple in structure, low in cost, long in service life and high in reliability.

(2) In the present invention, such containers as a furnace, a crucible or an extrusion head are not used, the molten raw material generated is not in contact with the heating device and is not in contact with the container; the temperature that can be reached by the molten raw material is not limited by the performance of the container, and a molten raw material of a conductive material with an ultrahigh melting point, for example, tungsten (with a melting point of 3400° C.), can be generated, the present invention is applicable for printing metal parts with an ultrahigh melting point, and this is of great significance.

(3) In the present invention, in a process of generating a molten raw material, the energy is concentrated, the range of action is small, the controllability of energy is high, and the fine structure generated during previous printing by a three-dimensional printing apparatus is not destroyed (different from the existing three-dimensional printing system based on arc heating or plasma heating which may destroy the fine structure generated during previous printing in a process of generating a molten raw material).

(4) In the present invention, if a wirelike solid raw material with a small wire diameter (for example, the wire diameter is 30 μm) is adopted, the diameter of a pixel point (voxel) and the diameter of particles on the surface of a printed object approximate to the diameter of the wirelike solid raw material, or the wire diameter of a molten segment generated at an instant is mainly influenced by the size of the wire diameter of the solid raw material, then a three-dimensional printing system which adopts the technology of the present invention can realize high-precision three-dimensional printing, and the precision can exceed that of the existing SLM (selective laser melting) and EBM (electron beam melting) technologies.

(5) In the present invention, spraying of a molten raw material is not driven through gas, while the movement of the molten raw material is controlled through the movement of the solid raw material, therefore, the present invention can be applied to a vacuum printing environment, can realize three-dimensional printing with a higher quality, and can generate high-quality printing parts (the density of parts is higher); the present invention can also be applied to a weightless environment. The existing three-dimensional printing technology which adopts arc heating or plasma heating cannot be used in a vacuum environment, and such three-dimensional printing technologies as SLM, EBM and LENS (laser coaxial powder delivery) which adopt powders cannot be used in a weightless environment (for example, space flight).

In summary, the present invention has the following beneficial effects: the controllability is high, the structure is simple, the cost is low, the service life is long and the reliability is high; a molten raw material of a conductive material with an ultrahigh melting point can be generated; the heating energy is concentrated, the range of action is small, the controllability of heating energy is high, and a fine structure previously generated through a three-dimensional printing apparatus is not destroyed; and the present invention can be applied to high-precision three-dimensional printing, and can be used to a vacuum and weightless printing environment. Therefore, the present invention has notable beneficial effects and possesses substantial progress.

Figure 1:
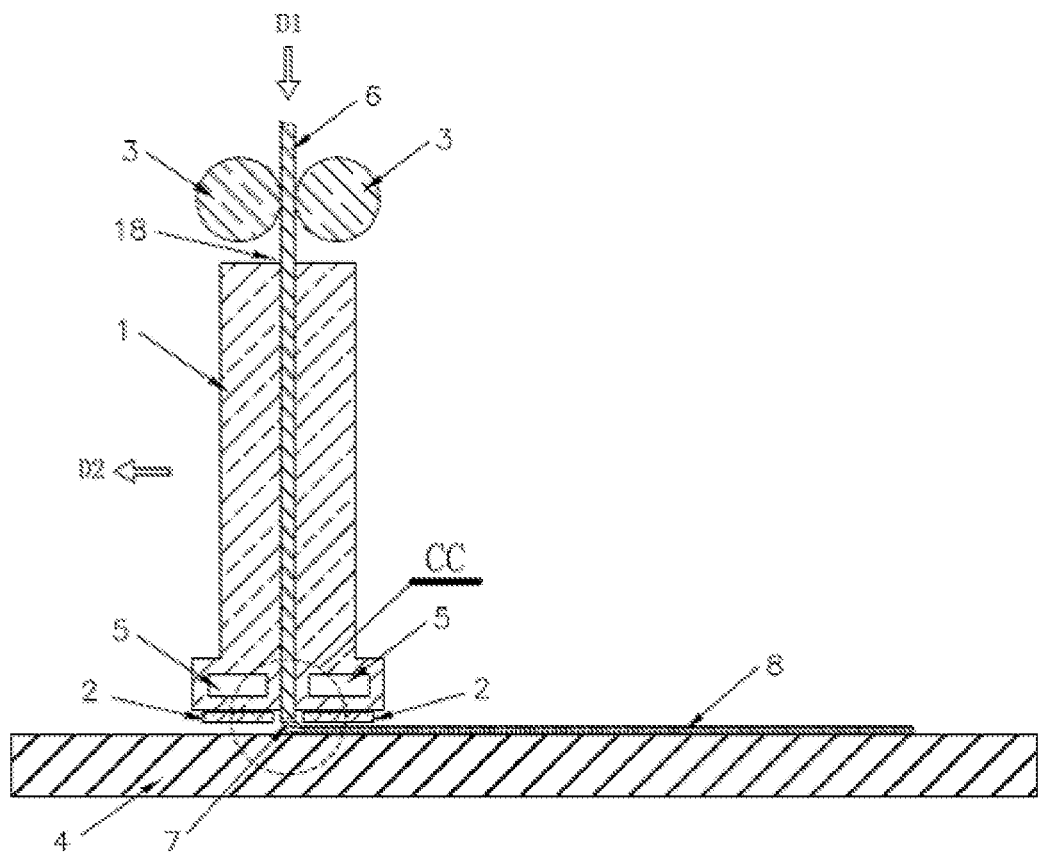
FIG. 1 is a schematic diagram which illustrates a principle for generating a molten raw material of a method for generating a molten raw material for three-dimensional printing of the present invention, and which also illustrates a composition principle of a first specific embodiment of an apparatus for generating a molten raw material for three-dimensional printing of the present invention; and arrows D1 and D2 in the figure represent the directions of movement.

Reference numerals in the figures: 1—guiding device I, 2—induction coil I, 3—feeding roller I, 4—support platform I, 5—cooling channel I, 6—wirelike solid raw material I, 7—molten segment I, 8—printed object I, 9—molten segment II, 10—guiding device II, 11—induction coil II, 12—feeding roller II, 13—support platform II, 14—cooling channel II, 15—wirelike solid raw material II, 16—molten segment III, 17—printed object II, 18—input end I, 19—output end I, 20—input end II, 21—output end II.

DETAILED DESCRIPTION OF THE EMBODIMENTS

The present invention will be described in detail below with preferred specific embodiments of the present invention as an example and in combination with the accompanying drawings.

Figure 2:
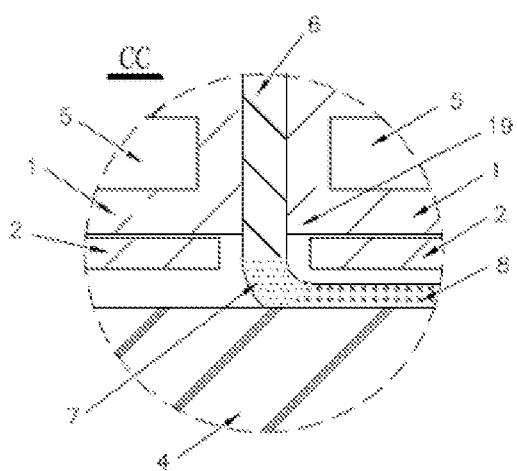
FIG. 2 is a schematic diagram and is an enlarged view of the portion encircled by a dotted line indicated by a mark CC in FIG. 1.
Figure 3:
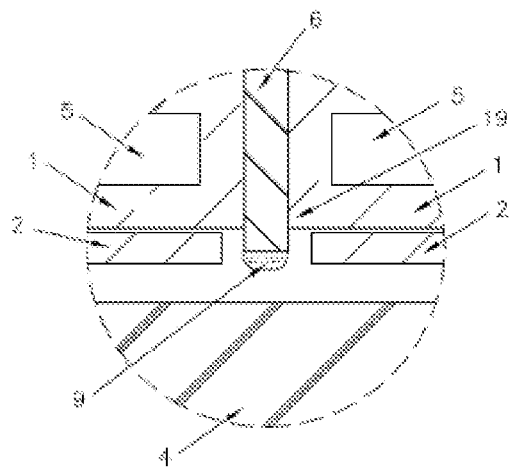
FIG. 3 is a schematic diagram illustrating a process of generating a molten raw material.

FIG. 1 to FIG. 3 show a specific embodiment of a method for generating a molten raw material for three-dimensional printing of the present invention, in which a solid raw material (namely, the wirelike solid raw material I 6) is heated to obtain a molten raw material (namely, the molten segment I 7), and in the process of generating the molten raw material, a guiding device (namely, the guiding device I 1) is adopted to guide a movement of the solid raw material; the guiding device is provided with an input end (namely, the input end I 18) and an output end (namely, the output end I 19), the solid raw material is input from the input end of the guiding device, and the solid raw material or the molten raw material is output from the output end of the guiding device; the molten raw material generated is accumulated on a printed object or a support platform of a three-dimensional printing apparatus; and the printed object (namely, the printed object I 8) refers to an object generated through accumulation of the molten raw material in the process of three-dimensional printing, and the support platform (namely, the support platform I 4) refers to a device or structure, configured to support the printed object in the process of three-dimensional printing, of the three-dimensional printing apparatus;

the key points lie in that:

the solid raw material is heated to a molten state by electromagnetic induction at the output end of the guiding device and/or outside the output end of the guiding device and thus a molten segment is formed; the molten segment generated is only in contact with the solid raw material and is supported by the solid raw material before being in contact with the printed object and/or the support platform (as shown in FIG. 3); and the molten segment generated is in contact with the solid raw material, the printed object and/or the support platform after being in contact with the printed object and/or the support platform, and is not in contact with other structures, and the molten segment is supported through being in contact with the solid raw material, the printed object and/or the support platform (as shown in FIG. 2);

the molten segment is namely the molten raw material;

the solid raw material used is meltable through electromagnetic induction heating.

In the present specific embodiment:

the molten segment generated is not in contact with the guiding device, and the molten segment is not in contact with an electromagnetic induction heating generator; and the electromagnetic induction heating generator is configured to play a role of electromagnetic induction heating.

In the present specific embodiment:

the solid raw material is output from the output end (namely, the output end I 19) of the guiding device, and the solid raw material is heated to a molten state by electromagnetic induction outside the output end of the guiding device and a molten segment (namely, the molten segment I 7 and the molten segment II 9) is formed.

In the present specific embodiment:

the solid raw material adopts a wirelike conductive solid raw material, and adopts a tungsten metal wire with a wire diameter of 50 μm.

In the present specific embodiment:

in a three-dimensional printing process, the molten segment generated is only in contact with the solid raw material, the printed object and/or the support platform or a support body, and is not in contact with other structures; and the support body refers to a structure which plays a role of supporting in the three-dimensional printing process (for example, an auxiliary support, an auxiliary support powder).

If a protective atmosphere is used in the process of generating the molten raw material, then the molten segment is in contact with the protective gas, however, the protective gas possesses no structural morphology.

In the present specific embodiment:

the position of the molten raw material (namely, the molten segment I 7 and the molten segment II 9) is controlled in a way as follows: the molten raw material is pushed away from the guiding device and away from the core area of a heating magnetic field generated by the electromagnetic induction heating generator, and to move towards the printed object (namely, the printed object I 8) or the support platform (namely, the support platform I 4) through a movement of the solid raw material generated when the solid raw material passes through the guiding device (in a direction of movement as shown by arrow D1 in FIG. 1); and the accumulation position of the molten raw material is controlled by the relative movement between the solid raw material and the printed object or the support platform. The electromagnetic induction heating generator is configured to play a role of electromagnetic induction heating. The printed object shown in FIG. 1 (namely, the printed object I 8) is a first layer of structure generated through three-dimensional printing.

In the present specific embodiment:

in a process of generating the molten raw material (namely, the molten segment I 7 and the molten segment II 9), after the molten raw material is in contact with the printed object or the support platform, a current is applied between the solid raw material and the printed object or the support platform, and the process in which the solid raw material is changed into the molten raw material is influenced through resistance heating: the melting rate of the solid raw material is increased, since an eddy current is induced through an alternating magnetic field generated by the electromagnetic induction heating generator within the solid raw material that passes through the magnetic field, the temperature of the solid raw material which passes through the magnetic field is raised, the rising of the temperature leads to an increase of the resistance value (the resistance value of most metals is increased along with the rising of temperature), after the current is applied between the solid raw material and the printed object or the support platform, a greater voltage component is obtained at an area with a higher resistance value, and then the rise of the temperature of the area with a high temperature is further accelerated; when the molten raw material does not need to be generated continuously, the molten segment is fused at an instant through the application of a large current, so as to separate the raw material from the printed object or the support platform; and in the process of generating the molten raw material, the molten raw material can also be heated to be fused through a current, so as to generate a molten raw material which is separate from the solid raw material on the printed object or the support platform, and a droplet of the raw material is formed on the printed object or the support platform (the molten state of the droplet is maintained for an extremely short time).

In the present specific embodiment:

the direction and the rate of the movement of the solid raw material are controllable; when generation of the molten raw material is to be finished, the solid raw material is withdrawn towards the guiding device, and the length to be withdrawn can be set.

In the present specific embodiment:

major steps of generating the molten raw material comprise:

step S1, the guiding device is driven by a control system to move to a specific spatial position; the specific spatial position is designated by a control program of a three-dimensional printing system, the guiding device moves to an initial position of a printing area according to a mapping relationship between a CAD data model and the support platform, and the height or distance between the guiding device and the support platform is adjusted to a preset value;

step S2, an electromagnetic induction heating magnetic field is activated, and the solid raw material is driven to pass through the guiding device (in a direction of movement as shown by arrow D1 in FIG. 1);

step S3, the solid raw material passes through the guiding device, arrives at a core area of the electromagnetic induction heating magnetic field outside the guiding device and is heated to melt within the core area, the segment melted forms a molten segment; and the molten segment is connected with the solid raw material;

step S4, the molten segment generated is pushed away from the guiding device and away from the electromagnetic induction heating magnetic field through a movement of the solid raw material generated when the solid raw material passes through the guiding device (in a direction of movement as shown by arrow D1 shown in FIG. 1), and the previously generated molten segment arrives at the printed object or the support platform; in the process in which the previously generated molten segment leaves the core area of the heating magnetic field and after the previously generated molten segment leaves the core area of the heating magnetic field, the solid raw material which subsequently enters the core area of the heating magnetic field is heated to melt, so as to form a continuous molten raw material flow; meanwhile, the guiding device is driven to move and then the solid raw material is brought to move (in a direction of movement as shown by arrow D2 shown in FIG. 1), so as to control the three-dimensional contact position between the molten segment and the printed object or the support platform (when each layer of printed object is accumulated, a two-dimensional movement is performed; after a layer of printed object is accumulated each time, a third-dimensional movement is performed, so as to realize switching between layers of a printed object); when each layer of printed object is accumulated, a scanning-type movement of the molten segment (the molten raw material) driven by a two-dimensional movement of the guiding device is brought by the rigidity of the solid raw material unmelted;

step S5, if generation of the molten raw material needs to be stopped (for example, the task is finished, the printing area needs to be switched, etc.), then the solid raw material is driven to withdraw for a set length (for example 10 μm) towards the guiding device (in a direction opposite to the direction shown by arrow D1 in FIG. 1); since the molten raw material is located between the solid raw material and the printed object and/or the support platform, when the solid raw material is withdrawn towards the guiding device, the molten segment is pulled, therefore, the wire diameter of the molten segment becomes smaller, the resistance value of the area with a smaller wire diameter is relatively high, and thus an area with a greater resistance value is formed within the molten segment;

step S6, a current (for example, a current with an intensity of 50 amperes which lasts for 50 microseconds) is applied between the solid raw material and the printed object or the support platform through the guiding device (the guiding device is manufactured from a metal material), a resistance heating effect is generated through the current applied to fuse the molten segment; since in step S5, an area with a greater resistance value is formed in the molten segment, a greater voltage component is obtained in the area (section) with a greater resistance value, therefore, fusing occurs in the area with a greater resistance value, and thus the position of fusing is controlled; and step S7, the electromagnetic induction heating magnetic field is shutdown or not shutdown (if only a printing area is switched, then the heating magnetic field may not be shutdown; if the printing task is finished, then the heating magnetic field is shutdown); and the guiding device is driven to move to a set spatial position (for example, an initial position of the next printing area, an initial position/origin position of a three-dimensional printing system).

FIG. 1 and FIG. 2 show a first specific embodiment of an apparatus for generating a molten raw material for three-dimensional printing of the present invention, to which the specific embodiment of the above-mentioned method for generating a molten raw material for three-dimensional printing of the present invention is applied. The apparatus for generating a molten raw material for three-dimensional printing is mainly composed of a driving device (the feeding roller I 3 belongs to a component of the driving device), a guiding device (namely, the guiding device I 1) and an electromagnetic induction heating generator, wherein the driving device is configured to push and pull a solid raw material to move; the guiding device is configured to guide a movement of the solid raw material, and the guiding device (namely, the guiding device I 1) adopts an overall tubular structure, and is provided with an input end (namely, the input end I 18) and an output end (namely, the output end I 19); the electromagnetic induction heating generator is configured to generate a magnetic field to heat the solid raw material (namely, the wirelike solid raw material I 6), the electromagnetic induction heating generator is mainly composed of an energy output stage (namely, the induction coil I 2) and an energy input stage (not shown in the figure), wherein the energy output stage generates a magnetic field, while the energy input stage modulates a current input from an external source (outside or the environment) and outputs the current modulated to the energy output stage; the driving device is connected with the guiding device, and the electromagnetic induction heating generator is connected with the guiding device.

A positional relationship between the electromagnetic induction heating generator and the guiding device is as follows: as shown in FIG. 2, the magnetic field generated by the electromagnetic induction heating generator presents a relationship of connection in series with the output end (namely, the output end I 19) of the guiding device on a movement route along which the solid raw material (namely, the wirelike solid raw material I 6) passes through the guiding device.

When the solid raw material passes through the magnetic field generated by the electromagnetic induction heating generator, the segment of the solid raw material (namely, the wirelike solid raw material I 6) located in a core area of the magnetic field induces an eddy current, so that the segment of the solid raw material is directly heated and thus a molten segment (namely, the molten segment I 7 or the molten segment II 9) is formed, and the molten segment generated is pushed by the solid raw material to leave the core area of the magnetic field generated by the electromagnetic induction heating generator. A positional relationship between the electromagnetic induction heating generator, the guiding device and the molten segment generated is as follows: the molten segment (namely, the molten segment I 7 or the molten segment II 9) is not in contact with the guiding device (namely, the guiding device I 1), and the molten segment is not in contact with the electromagnetic induction heating generator.

In the present specific embodiment:

the output stage of the electromagnetic induction heating generator adopts a coil (namely, the induction coil I 2), and the number of turns thereof is one; the induction coil I 2 is arranged outside the output end (namely, the output end I 19) of the guiding device and presents a relationship of connection in series with the output end of the guiding device (namely, the output end I 19) on a movement route (in a movement direction as shown by arrow D1) along which the solid raw material (namely, the wirelike solid raw material I 6) passes through the guiding device, that is, the solid raw material is output from the output end of the guiding device, and enters a space surrounded by the output stage (namely, the induction coil I 2) of the electromagnetic induction heating generator.

The solid raw material (namely, the wirelike solid raw material I 6) is melted in the space surrounded by the output stage (namely, the induction coil I 2) of the electromagnetic induction heating generator, and the molten segment (namely, the molten segment I 7 or the molten segment II 9) which is connected with the wirelike solid raw material I 6 are formed; and the molten segment is not in contact with the induction coil I 2, that is, a space surrounding the molten segment exists between the molten segment and the induction coil I 2, and the molten segment is isolated from the induction coil I 2.

In the present specific embodiment:

a cooling structure (namely, the cooling channel I 5) is arranged at the output end (namely, the output end I 19) of the guiding device, and the cooling structure guides away the heat at the output end of the guiding device and the electromagnetic induction heating generator. The cooling liquid inside the cooling channel I 5 is connected with a heat dissipation mechanism through a pipeline (not shown in the figure).

In the present specific embodiment:

the driving device is mainly composed of a feeding roller (namely, the feeding roller I 3) and a motor, wherein the motor drives the feeding roller to rotate, and the feeding roller brings the solid raw material (namely, the wirelike solid raw material I 6) to move and pass through the guiding device (namely, the guiding device I 1).

In the present specific embodiment:

the guiding device is provided with a hole structure which serves as a guiding structure to guide a movement of the solid raw material; and the guiding device is provided with an elastic structure (not shown in the figure) which is configured to enhance a fitting degree between the solid raw material and the guiding device. The higher the fitting degree is, the more reliable the electric connection between the solid raw material and the guiding device is, and the lower the resistance value between the two is.

In the present specific embodiment:

the guiding device is manufactured from a copper alloy; and the support platform is manufactured from stainless steel. A resistance heating current generating circuit is arranged between the guiding device and the support platform, and is configured to apply a current between the guiding device and the support platform, and thus apply a current between the solid raw material and the printed object and/or the support platform, so as to regulate the process of generating a molten raw material.

In the present specific embodiment:

the molten raw material (the molten segment I 7) is accumulated on the support platform I 4, the wirelike solid raw material I 6 moves rapidly in a direction of movement as shown by arrow D1 and passes through the guiding device I 1 (for example, 1 m/s), and a segment within the space surrounded by the induction coil I 2 is melted instantaneously, and thus the molten segment I 7 is formed. The molten segment I 7 is rapidly pushed away from the space surrounded by the induction coil I 2 and arrives at the support platform I 4, and the printed object I 8 (the printed object I 8 is a first layer of the printed object formed through accumulation) is formed on the support platform I 4. The previously generated molten segment I 7 is pushed away from the space surrounded by the induction coil I 2, and the solid raw material which subsequently enters a space surrounded by the induction coil I 2 is melted instantaneously and then a subsequent molten segment I 7 is generated, thereby a molten raw material flow is formed. Due to a small wire diameter of the solid raw material (in the present specific embodiment, a tungsten metal wire with a wire diameter of 50 μm is adopted), a high rate of movement of the solid raw material (for example, the movement rates in two directions shown by arrow D1 and arrow D2 are both 1 m/s) and a high energy output power of the electromagnetic induction heating generator (in the present specific embodiment, a power of 600 W is output), the molten segment I 7 is not in contact with the induction coil I 2 (the heat can only be guided away by the protective atmosphere, the printed object I 8 and the support platform I 4). When the generation rate of the molten segment I 7 is high enough (for example, 1 m/s), the rate of movement of the guiding device I 1 is high enough (for example, the rate in the direction shown by arrow D2 is 1 m/s), and an effect of electromagnetic induction heating exists consistently, it can be ensured that, while the previously generated molten segment I 7 is in contact with the printed object I 8 and/or the support platform I 4, the subsequently generated molten segment I 7 is maintained in a molten state.

The distance between a lower end face of the induction coil I 2 and the support platform I 4 is 1.5 times as great as the wire diameter of the solid raw material (when the first layer of the printed object I 8 is printed), or the distance between the lower end face of the induction coil I 2 and the printed object is 1.5 times as great as the wire diameter of the solid raw material (when the second layer and layers above the second layer of the printed object I 8 are printed). The thickness of the induction coil I 2 is 100 μm, and the width of a ring of the induction coil is 3 mm. The induction coil I 2 is closely adjacent to the output end I 19 of the guiding device I 1, with a layer of thin insulating layer (for example, a quartz film with a thickness of 5 μm) having a good thermal conductivity therebetween, and the thickness of a structure between the cooling channel I 5 and the induction coil I 2 is 150 μm. The induction coil I 2 will also generate heat in the process of generating an alternating magnetic field, and the heat of the induction coil I 2 is guided away by an adjacent cooling channel I 5. The cooling channel I 5 will simultaneously guide away the heat of the output end I 19. The cooling liquid inside the cooling channel I 5 is cooled down by a refrigeration unit in advance, so as to improve the heat dissipation efficiency, for example, a calcium chloride solution is used as the cooling liquid and is cooled down to −20° C. before being input into the cooling channel I 5.

Since the wirelike solid raw material I 6 moves rapidly to pass through the guiding device I 1 (for example, 1 m/s) and through the core area of the magnetic field generated by the energy output stage (namely, the induction coil I 2) of the electromagnetic induction heating generator, a portion of the wirelike solid raw material I 6 (a certain segment) is rapidly melted, the molten segment I 7 generated is rapidly pushed away, and the wirelike solid raw material I 6 has a rigidity before being melten, therefore, the rigidity of the wirelike solid raw material I 6 can be utilized to bring the molten segment I 7 to move in a direction as shown by arrow D2.

As shown in FIG. 3, before the wirelike solid raw material I 6 is in contact with the printed object I 8 and/or the support platform I 4, the wirelike solid raw material I 6 passes through the core area of the magnetic field generated by the induction coil I 2, a front end of the wirelike solid raw material I 6 is first melted, and thus a molten segment II 9 is formed, and the molten segment II 9 is adhered with the wirelike solid raw material I 6 (the molten segment II 9 is supported by the wirelike solid raw material I 6); due to the rapid movement of the wirelike solid raw material I 6, the position of the molten segment II 9 deviates towards one side, close to the support platform I 4, of the space surrounded by the induction coil I 2; and due to the rapid movement, before the molten segment II 9 is in contact with the printed object I 8 and/or the support platform I 4, the existence time of the molten segment II 9 as a free end is short, the molten segment II 9 cannot be deformed dramatically by the surface tension of the molten segment II 9. Similarly, as shown in FIG. 2, the position of the molten segment I 7 also deviates towards the side, close to the support platform I 4, of the space surrounded by the induction coil I 2; after the molten segment is in contact with the printed object I 8 and/or the support platform I 4, since the molten segment I 7 is simultaneously connected with the wirelike solid raw material I 6, the printed object I 8 and/or the support platform I 4, and since the wirelike solid raw material I 6 moves rapidly in the directions shown by arrow D1 and arrow D2, the molten segment I 7 cannot be deformed by the surface tension of the molten area I 7.

Figure 4:
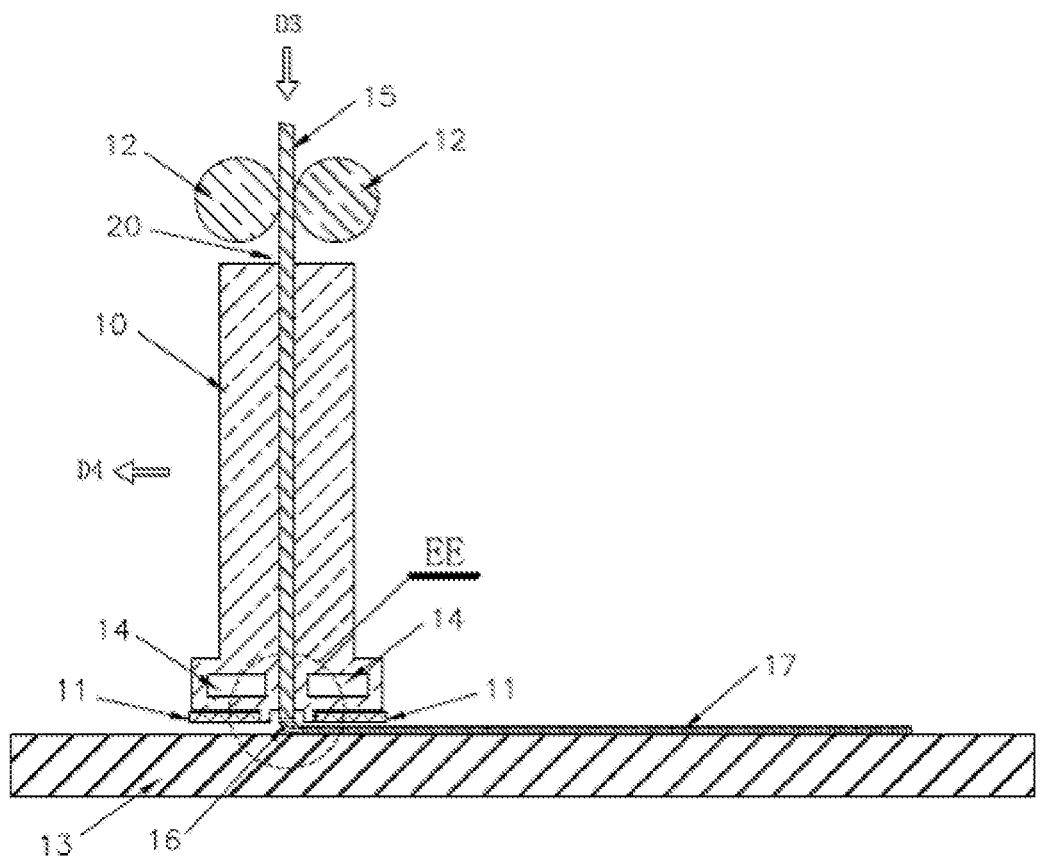
FIG. 4 is a schematic diagram illustrating a second specific embodiment of an apparatus for generating a molten raw material for three-dimensional printing of the present invention, and arrows D3 and D4 in the figure represent the directions of movement.
Figure 5:
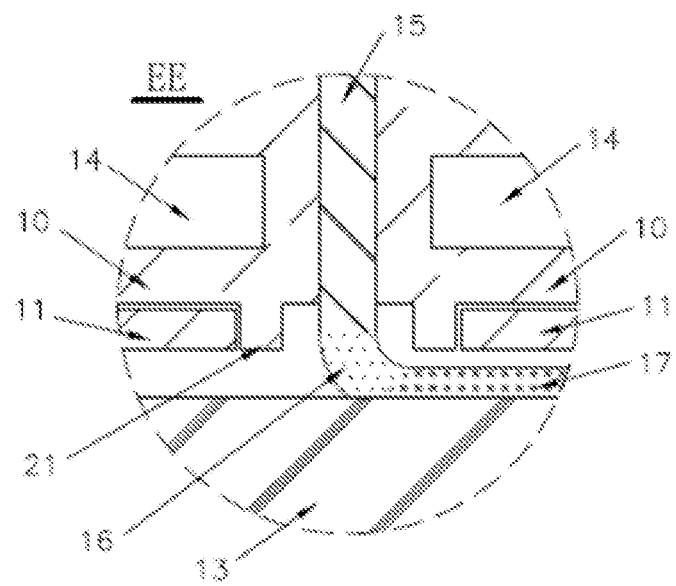
FIG. 5 is a schematic diagram and is an enlarged view of the portion encircled by a dotted line indicated by a mark EE in FIG. 4.

FIG. 4 and FIG. 5 show a second specific embodiment of an apparatus for generating a molten raw material for three-dimensional printing of the present invention, to which the specific embodiment of the above-mentioned method for generating a molten raw material for three-dimensional printing of the present invention is applied. The apparatus for generating a molten raw material for three-dimensional printing is mainly composed of a driving device (a feeding roller II 12 belongs to a component of the driving device), a guiding device (namely, the guiding device II 10) and an electromagnetic induction heating generator, wherein the driving device is configured to push and pull a solid raw material (namely, the wirelike solid raw material II 15) to move; the guiding device is configured to guide a movement of the solid raw material, and the guiding device is provided with an input end (namely, the input end II 20) and an output end (namely, the output end II 21); the electromagnetic induction heating generator is configured to generate a magnetic field to heat the solid raw material (namely, the wirelike solid raw material II 15), the electromagnetic induction heating generator is mainly composed of an energy output stage (namely, the induction coil II 11) and an energy input stage (not shown in the figure), wherein the energy output stage generates a magnetic field, while the energy input stage modulates a current input from an external source and outputs the current modulated to the energy output stage; and the driving device is connected with the guiding device, and the electromagnetic induction heating generator is connected with the guiding device.

In the present specific embodiment:
the output stage (namely, the induction coil II 11) of the electromagnetic induction heating generator is arranged at the output end (namely, the output end II 21) of the guiding device, and presents a nested relationship with the output end of the guiding device on a movement route (in a direction of movement as shown by arrow D3 in FIG. 4) along which the solid raw material passes through the guiding device, that is, as shown in FIG. 5, a nested area exists between the space surrounded by the induction coil II 11 and the space surrounded by the output end II 21, the solid raw material (namely, the wirelike solid raw material II 15) is melted in the nested area when it passes through the nested area, and thus a molten segment (namely, the molten segment III 16) connected with the solid raw material is formed.

The molten segment III 16 generated is not in contact with the induction coil II 11, and is not in contact with the output end II 21, that is, a space surrounding the molten segment III 16 exists between the molten segment III 16 and the induction coil II 11 as well as the output end II 21, and the molten segment III 16 is isolated from the induction coil II 11 and the output end II 21.

In the present specific embodiment:
the present specific embodiment differs from the first specific embodiment of an apparatus for generating a molten raw material for three-dimensional printing of the present invention as shown in FIG. 1 to FIG. 2 mainly in that: the connection types between the output end of the guiding device and the energy output stage of the electromagnetic induction heating generator are different, the output end II 21 and the induction coil II 11 in the second specific embodiment have a nested relationship in terms of structural connection type, while the output end I 19 and the induction coil I 2 in the first specific embodiment have a relationship of connection in series in terms of structural connection type.

In the present specific embodiment:
a cooling structure (namely, the cooling channel II 14) is arranged at the output end of the guiding device, and the cooling structure guides away the heat at the output end of the guiding device and the electromagnetic induction heating generator. The cooling liquid inside the cooling channel II 14 is connected with a heat dissipation mechanism through a pipeline (not shown in the figure).

In the present specific embodiment:
the driving device is mainly composed of a feeding roller (namely, the feeding roller II 12) and a motor (not shown in the figure), wherein the motor drives the feeding roller to rotate, and the feeding roller brings the solid raw material (namely, the wirelike solid raw material II 15) to move and pass through the guiding device.

In the present specific embodiment:
the output end (namely, the output end II 21) of the guiding device II 10 is manufactured from a non-conductive material (for example, quartz).

The rigidity of the wirelike solid raw material II 15 is utilized to bring the molten segment III 16 to move rapidly (for example, 1 m/s) in the direction as shown by arrow D4, and the molten segment III 16 is pushed to rapidly (for example 1 m/s) leave the space within the output end of the guiding device II 10 through the movement of the wirelike solid raw material II 15 when it passes through the guiding device II 10 (in the direction as shown by arrow D3). The molten segment III 16 is not in contact with the output end (namely, the output end II 21) of the guiding device II 10.

What is described above are merely some preferred specific embodiments of the present invention, and should not be deemed to restrict the implementation scope of the present invention, that is, equivalent transformations and modifications made based on the contents of claims and description of the present invention shall all fall within the scope of the present invention.

The invention claimed is:

1. A method for generating a molten raw material for three-dimensional printing, in which a solid raw material is heated to obtain the molten raw material, and a guiding device is configured to guide a movement of the solid raw material in a process of generating the molten raw material; the guiding device is provided with an input end and an output end, the solid raw material is input from the input end of the guiding device, and the solid raw material or the molten raw material is output from the output end of the guiding device; the molten raw material generated is accumulated on a printed object or on a support platform of a three-dimensional printing apparatus; the printed object is an object generated through accumulation of the molten raw material in a process of three-dimensional printing, and the support platform is a device or structure, configured to support the printed object in the process of three-dimensional printing, of the three-dimensional printing apparatus;

wherein:
the solid raw material is heated to a molten state by electromagnetic induction at the output end of the guiding device and/or outside the output end of the guiding device and thus a molten segment is formed; the molten segment generated is only in contact with the solid raw material and is supported by the solid raw material before being in contact with the printed object and/or the support platform; the molten segment generated is in contact with the solid raw material, the printed object and/or the support platform and is not in contact with other structures after being in contact with the printed object and/or the support platform, and the molten segment is supported by being in contact with the solid raw material, the printed object and/or the support platform; the molten segment constitutes the molten raw material; and
the solid raw material used is meltable through electromagnetic induction heating,
wherein in the process of generating the molten raw material, after the molten raw material is in contact with the printed object or the support platform, an electrical current is applied between the solid raw material and the printed object or the support platform.

2. The method for generating a molten raw material for three-dimensional printing of claim 1, wherein the position of the molten raw material is controlled in a way as follows: the molten raw material is pushed away from the guiding device and/or away from a heating magnetic field generated by an electromagnetic induction heating generator and to move towards the printed object or the support platform through a movement generated by the solid raw material when the solid raw material passes through the guiding device; an accumulation position of the molten raw material is controlled by the relative movement between the solid raw material and the printed object or the support platform.

3. The method for generating a molten raw material for three-dimensional printing of claim 1, wherein the solid raw material is a wire-shaped solid raw material, a filamentous solid raw material, a strip-shaped solid raw material or a bar-shaped solid raw material; and the solid raw material is an electrically conductive material.

4. The method for generating a molten raw material for three-dimensional printing of claim 1, wherein a magnetic field which performs electromagnetic induction heating heats the guiding device, and the heat carried by the guiding device is partially or completely transferred to the solid raw material before the solid raw material is melted.

5. The method for generating a molten raw material for three-dimensional printing of claim 1, wherein the guiding device is provided with a driving device and an electromagnetic induction heating generator, the driving device is configured to push and/or pull the solid raw material to move, and the electromagnetic induction heating generator is configured to perform electromagnetic induction heating.

6. An apparatus for generating a molten raw material for three-dimensional printing for implementing the method for generating a molten raw material for three-dimensional printing of claim 1, comprising: a driving device, a guiding device, and an electromagnetic induction heating generator, in which the driving device is configured to push and/or pull a solid raw material to move; the guiding device is configured to guide a movement of the solid raw material, the guiding device is provided with an input end and an output end; the electromagnetic induction heating generator is configured to generate a magnetic field to heat the solid raw material, the electromagnetic induction heating generator comprises an energy output stage and an energy input stage, the energy output stage generates a magnetic field, and the energy input stage modulates an electrical current input from an external source and outputs the electrical current modulated to the energy output stage; the driving device is connected or not connected with the guiding device, and the electromagnetic induction heating generator is connected or not connected with the guiding device;

wherein: an eddy current is induced in the solid raw material when the solid raw material passes through the magnetic field generated by the electromagnetic induction heating generator, so that the solid raw material can be directly heated; the solid raw material is heated to generate a molten segment, the molten segment generated is pushed by the solid raw material to leave the magnetic field generated by the electromagnetic induction heating generator, or leave the magnetic field generated by the electromagnetic induction heating generator and a space surrounded or partially surrounded by the guiding device; and a positional relationship between the electromagnetic induction heating generator, the guiding device and the molten segment generated is as follows: the molten segment is not in contact with the guiding device, and the molten segment is not in contact with the electromagnetic induction heating generator.

7. The apparatus for generating a molten raw material for three-dimensional printing of claim 6, wherein:
the output stage of the electromagnetic induction heating generator is arranged outside the output end of the guiding device and is positioned so that the solid raw material is output from the output end of the guiding device, and enters a space surrounded or partially surrounded by the output stage of the electromagnetic induction heating generator;
the solid raw material is melted in the space surrounded or partially surrounded by the output stage of the electromagnetic induction heating generator, and thus a molten segment connected with the solid raw material is formed; and the molten segment is not in contact with the output stage of the electromagnetic induction heating generator, that is, a space surrounding the molten segment exists between the molten segment and the output stage of the electromagnetic induction heating generator; or:

the output stage of the electromagnetic induction heating generator is arranged at the output end of the guiding device and is positioned so that a nested or overlapping area exists between the space surrounded or partially surrounded by the output stage of the electromagnetic induction heating generator and a space surrounded or partially surrounded by the output end of the guiding device, the solid raw material is melted in the area when passing through the nested or overlapping area, and thus a molten segment connected with the solid raw material is formed; and the molten segment generated is not in contact with the output stage of the electromagnetic induction heating generator, and is not in contact with the output end of the guiding device, that is, a space surrounding the molten segment exists between the molten segment and the output stage of the electromagnetic induction heating generator as well as the output end of the guiding device.

8. The apparatus for generating a molten raw material for three-dimensional printing of claim 6, wherein a cooling structure is arranged at the output end of the guiding device, and is configured to guide away or partially guide away the heat of the output end of the guiding device and/or the electromagnetic induction heating generator.

9. The apparatus for generating a molten raw material for three-dimensional printing of claim 6, wherein:

the guiding device is provided with a groove structure, a hole structure or a ring structure, which serves as a guiding structure to guide the movement of the solid raw material; and the guiding device is provided with an elastic member configured to enhance a fitting degree between the solid raw material and the guiding device.

\* \* \* \* \*

UNITED STATES PATENT AND TRADEMARK OFFICE
CERTIFICATE OF CORRECTION

PATENT NO. : 11,059,095 B2  
APPLICATION NO. : 16/463574  
DATED : July 13, 2021  
INVENTOR(S) : Fupeng Liang Page 1 of 1

It is certified that error appears in the above-identified patent and that said Letters Patent is hereby corrected as shown below:

In the Claims

In Column 20, Line 38, in Claim 6, delete "wherein:" and insert --wherein-- therefor Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*